Nov. 24, 1959   J. MAURICE ET AL   2,914,131
CONTROL MECHANISM FOR AUTOMATIC CLUTCHES
OF AUTOMOTIVE VEHICLES
Filed Oct. 1, 1956   3 Sheets-Sheet 1

United States Patent Office 2,914,131
Patented Nov. 24, 1959

2,914,131

CONTROL MECHANISM FOR AUTOMATIC CLUTCHES OF AUTOMOTIVE VEHICLES

Jean Maurice and Michel Rist, Paris, France, assignors to Societe Anonyme Francaise du Ferodo, Paris, France, a corporation of France Application October 1, 1956, Serial No. 613,039

Claims priority, application France October 5, 1955

5 Claims. (Cl. 180—82)

Automobile clutches, which are also sometimes termed semi-automatic, permit of simple and comfortable driving by virtue of the elimination of the clutch pedal. The new possibilities which are thus made available to the user may however incite the latter to certain unfortunate acts of negligence.

For example, automatic clutches are generally such that they are de-coupled when the engine is idling. When the engine is running idle, the vehicle may therefore remain stationary even if a gear is engaged, and the user can leave the vehicle in this condition. If then any part whatever of the vehicle is touched which has an influence on the engine speed, the vehicle will then start away in an untimely manner.

Such conditions may be produced for example, when the user or another person, forgetting the fact that a gear may be engaged, acts on the rod or cable system of the accelerator with a view to regulating the idling speed of the engine, or for other adjustments, for example that of the voltage regulator. As will be well understood, negligence of this kind is liable to cause an accident which is all the more serious as it is least expected.

It may also happen that a child amuses himself by imitating the driver in a stationary vehicle and places himself at the steering wheel. If the user has left the vehicle with the engine idling and a gear engaged, while giving the child such a possibility of playing in the manner described, the latter may, for example, by a single thoughtless action on the accelerator pedal, cause the vehicle to start-up unexpectedly.

In addition to the risks referred to above, automatic clutches may cause the user to start away with an insufficiently low gear combination, and he may also be induced not to change down his gears when this is necessary. Such faults in driving result in prolonged periods of slip which result in wear of the automatic clutch. In order to give an idea, starting-up a vehicle in third gear may develop ten times the amount of heat as starting-up in first gear. Automatic clutches generally absorb such divergencies of operation without showing any immediate sign of fatigue. The user is thus not warned, and is tempted to commit the same fault again. It will of course be obvious that the consequence of such repeated bad treatment will rapidly put the members of the transmission, the clutch, and even the engine out of commission.

The present invention has for its object a control mechanism for automatic clutches of automotive vehicles, which removes the dangers referred to above. Another object is to provide control mechanism which will operate to prevent engagement of the clutch or cause disengagement of the clutch when the output of the gear-box lies within predetermined unsafe limits.

In accordance with the invention, a safety device for automobile vehicles with automatic clutches is characterised by two members which act on the driving control of the vehicle, one of the said members being controlled in dependence on the position occupied by the gear-changing mechanisms, while the other member is made sensitive to the conditions of working when the latter are unusual with respect to the said position.

The objects, special features and advantages of the invention will furthermore be brought out in the description which follows below of forms of embodiment chosen by way of example, reference being made to the accompanying drawings, in which.

Figure 1:
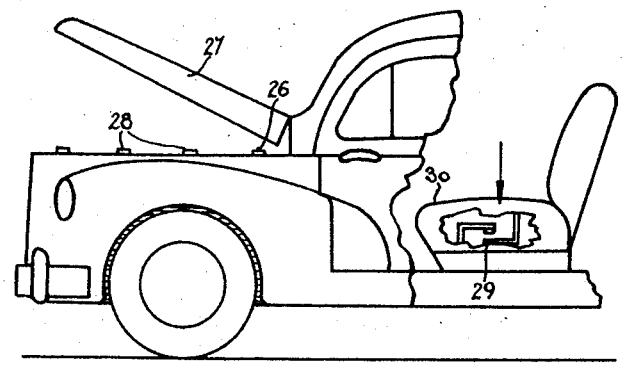
Fig. 1 is a partial view of an automobile vehicle provided with a safety device in accordance with the invention.
Figure 2:
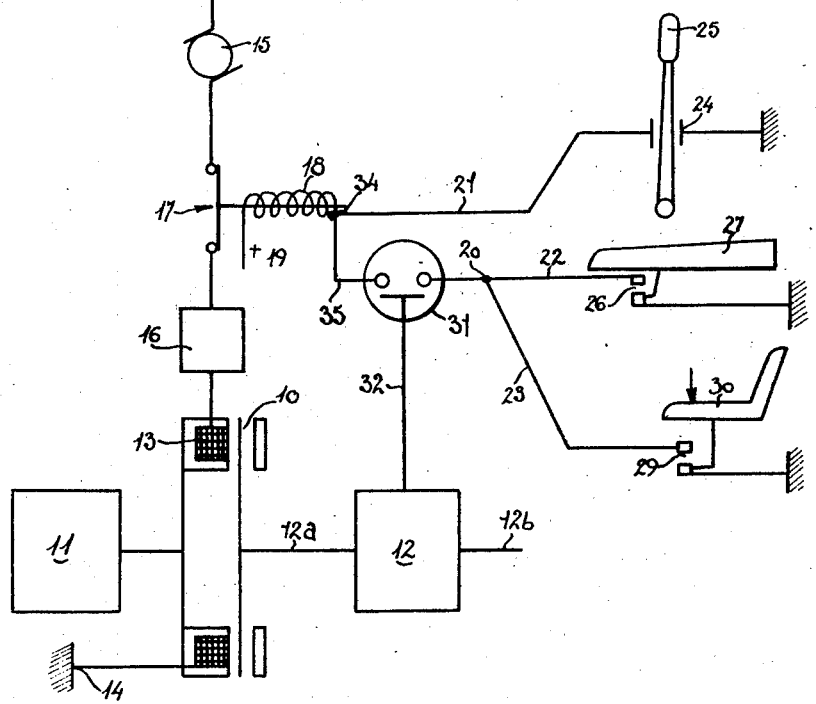
Fig. 2 is an electrical diagram of the said safety device.

In the method of construction shown in Figs. 1 and 2, which concerns by way of example, and not in any limiting sense, an application of the invention to a vehicle provided with an electro-magnetic clutch of the type well known by the name of Ferlec or other similar type, there is seen at 10 in the diagram of Fig. 2 a clutch of this kind which is intended to couple together the engine shaft 11 and the primary shaft 12a of the gear-box 12, the secondary shaft of which is shown at 12b. The coil 13 of the electro-magnet of the clutch produces a grip in the clutch which varies as a direct function of the electric current which is supplied to it.

One end of the coil 13 is connected to ground at 14, while the other end is connected to the dynamo 15 of the vehicle through the intermediary of a suitable regulator 16 and an opening relay 17. The dynamo being driven by the engine and therefore responsive to the engine speed constitutes a first declutching device, or the dynamo 15 or the regulator 16 together form a first declutching device. The relay 17 as will be described forms a second declutching device. The coil 18 of the relay 17 has one end connected to the battery 19 of the vehicle, while the other end is connected to a point 34 from which lead out two conductors 21 and 35. The conductor 21 terminates at ground and includes a pressure responsive switch 24 associated with a gear-changing lever of the type disclosed in United States Patent No. 2,846,036 or other type known as the broken lever type. The switch 24 is closed or open, depending on whether the lever 25 is actuated or not.

A further control of the second declutching device, i.e., relay 17, is provided in an electric circuit having a conductor 35 connected to a second switch 31, the latter being operated at 32 by the gear-changing mechanism and responsive to the output of the gear-box 12, so that it is open when the said gear-box 12 is in the neutral position (the position in which it has been shown) and closed in the contrary case. The said second switch 31 is connected to a point 20 from which lead out in parallel two conductors 22 and 23 which terminate at ground. The conductor 22 is connected to a third switch 26 associated with a movable member for example the hood 27 of the vehicle (see Figs. 1 and 2) so as to be closed or open, depending on whether the said hood is raised or closed. The hood 27 is shown in Fig. 2 in the closed position. The switch 26 is preferably arranged at the point of mounting of one of the elastic washers 28 or the like (see Fig. 1) inserted between the hood and the frame.

The conductor 23 is connected to an alternative third switch 29 which is associated with the driving seat 30 of the vehicle so as to be closed or open, depending on whether the weight applied to the said seat is less or greater than a pre-determined value. Any appropriate means may be adopted to this end, such as elastic or like devices in which a part is made movable as a function of the load. The predetermined value referred to above is chosen in the neighbourhood of the load produced by an adult person of average weight but should be greater than the load produced by a child of 13 or 14 years of age of average development. The switch 29 and the seat 30 are shown in Fig. 2 in the position which they would occupy with a driver of normal weight seated on the said seat 30. Of course as shown both the aforesaid third swtiches 26 and 29 may be employed.

When the starting conditions are normal, that is to say with the user seated in the driving seat 30 and the hood 27 down, the switches 26 and 29 are open and the clutch operates in the usual manner. It will be appreciated that when the gear-box is in its neutral position, the clutch is engaged which ensures that the pinions of the gear-box are set in preparatory rotation to facilitate the engagement of the gears.

If the starting conditions are abnormal, for example if there is no one seated in the driving seat or again if it is a child who is occupying this said seat, the switch 29 closes. If a gear is engaged, which will close the switch 31, the supply current to the coil 13 is cut-off at 17 and the clutch is disengaged. All danger is eliminated.

The same conditions occur if the hood 27 is raised. The user can thus check-over with complete safety the members of his vehicle. By virtue of the judicious position of the switch 26, a mechanic can even operate with one hand the parts of the engine, after having engaged a gear, while with the other hand he tries the switch 26 in order to find out purposely the circumstances in which the vehicle begins to start-off. Of course, when the vehicle is provided, in addition to the hood switch 26, with a seat switch 29 as shown in the drawing, the mechanic will then take the precaution to open this switch 29 while he is making such tests. It will be seen that should the switch 31 close when it is unsafe for the clutch to be engaged due to the hood or bonnet being open or no one being in the driving seat, either or both of the switches 26, 29 will override the switch 31 and prevent engagement of the clutch.

Figure 3:
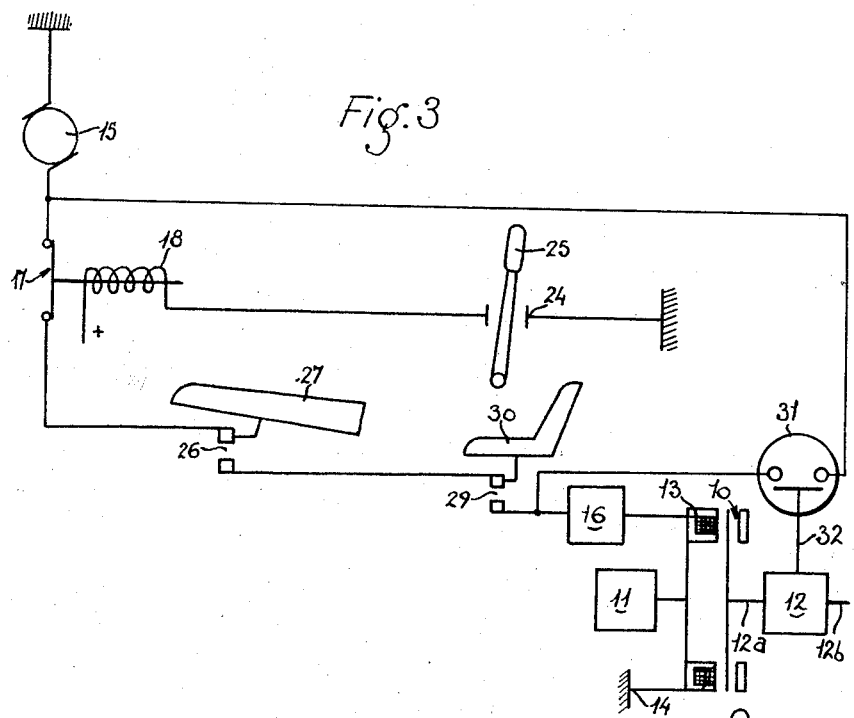
Figs. 3, 4, 5 and 6 are respectively four alternatives of this diagram.

In an alternative arrangement (see Fig. 3) the arrangement is similar to that which has just been described with reference to Figs. 1 and 2, but the electric circuit is slightly different. The switches 26 and 29 are not in this case inserted in the supply circuit of the relay 17, but in the circuit of the coil 13. These switches are connected in series and operate in the opposite sense to that of the previous case. The switch 26 is in this case closed or open, depending on whether the hood 27 is lowered or raised, while the switch 29 is closed or opened, depending on whether the weight applied to the seat 30 is greater or less than the predetermined value. The swtich 31 in this case short-circuits both the switches 26 and 29 and the relay 17 of the gear-changing lever 25, and is closed or opened, depending on whether the gear-box 12 is or is not in the neutral position. By virtue of this arrangement, there are obtained re-engagements of the clutch which the user can make use of in synchronisation by acting or not acting on the accelerator pedal whenever the gear-changing lever 25 passes through its neutral position.

Figure 4:
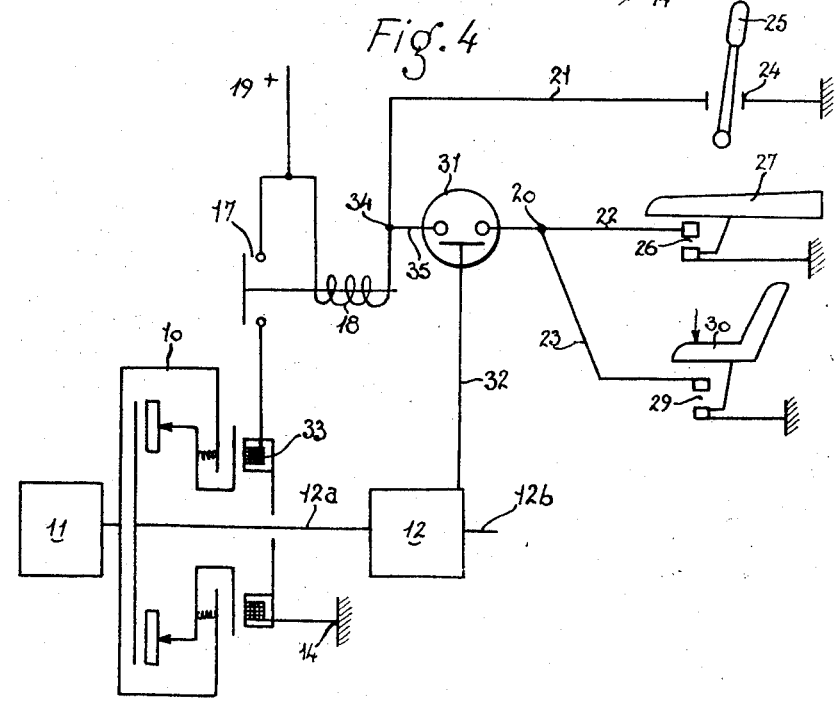

Reference will now be made to Fig. 4, which concerns an application of the invention to a vehicle, the clutch 10 of which is of the centrifugal type with an auxiliary de-clutching electro-magnet 33. The arrangement is for example such that when the coil 33 of the said electro-magnet is supplied with insufficient current, the clutch is effectively controlled by the centrifugal force produced by weight-heads rotating at the speed of the engine 11, these weight heads therefore form a first declutching device but when the coil 33 is supplied with sufficient current, the weight-heads become locked in position and the clutch is then disengaged.

The coil 33 is fed from the battery 19 through the intermediary of a relay 17 forming a second declutching device, the coil 18 of which relay has a circuit similar to the circuit of the coil 18 of Fig. 2, with the battery 19, switch 31, conductors 21, 22, 23, and seat switch 29 of the seat 30. In this case however, the relay 17 is a closing relay.

When the starting conditions are normal, with the hood 27 lowered and the seat 30 subjected to the weight of the user, the clutch will become engaged as and when the speed of the engine increases. If, on the other hand, the starting conditions are abnormal, with the hood 27 raised and/or the seat 30 subjected to no load or an abnormally low load, the clutch remains disengaged since the switch 26 or 29 or both said switches override the switch 31 even if the engine speed is accelerated and when the gear-box 12 occupies a position other than its neutral position. All danger is thereby again removed.

In the forms of embodiment which have just been described with reference to Figs. 1 to 4, the safety device controls the possibility of starting-away as a function of the condition, normal or unusual, of the hood and/or of the driving seat. In the alternative forms which will now be described, this control concerns not only the conditions of starting away but also those of running, and more particularly causes the intervention of the low or high gear combination of the gear-box and/or the speed of the vehicle.

Figure 5:
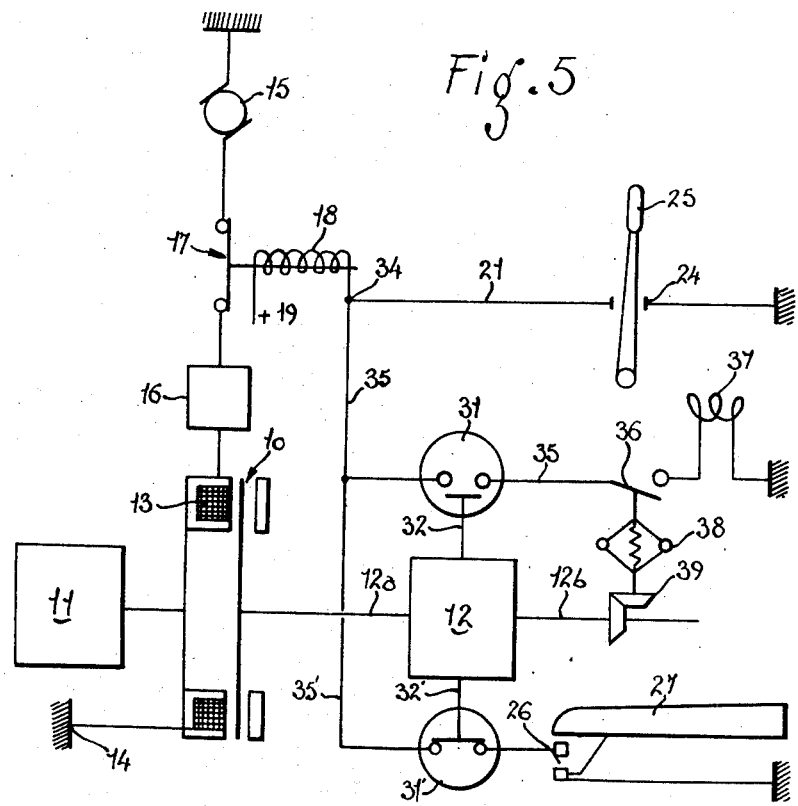

Reference will now be made to Fig. 5, which concerns an application of the invention to an automobile vehicle having an electro-magnetic clutch of the same type as that shown in Fig. 2. There will be seen in Fig. 5 the clutch 10, the engine 11 and the gear-box 12 with the primary shaft 12a and the secondary shaft 12b, at 16 the clutch regulator, at 19 the battery, at 15 the dynamo and at 17 the opening relay with its coil 18 having one end connected to the said battery 19.

The control of the second declutching device, i.e., the relay 17, includes the conductor 35 which is led out from the point 34 and which terminates at ground, includes in this case in series, the switch 31, a switch 36 and a filament 37 of a dash-board indicator lamp. The switch 31 is controlled as in the aforesaid constructions by the gear-changing mechanism, and is for example coupled at 32 to the gear-box 12. But in this case, the engagement is such that the switch 31 is open at the first gear, at the second gear and in reverse, and is closed in third gear and for all higher gear combinations when such are provided on the vehicle. The switch 36 is sensitive to the speed of the vehicle so as to be opened or closed, depending on whether the said speed is greater or less than 15 km. per hour.

A conductor 35' may be connected if so desired to the conductor 35, between the point 34 and the switch 31. The conductor 35' terminates at ground and comprises in series the switch 26 of the hood 27 and a switch 31' controlled by the gear-changing mechanism, for example being coupled at 32' to the gear-box 12. Instead of or in addition to the switch 26 of the hood 27, the conductor 35' could comprise a shunt to the switch 29 of the seat 30. As in the aforesaid constructions, the switch 26 is closed or opened, depending on whether the hood 27 is raised or lowered, while the switch 31' is in this case closed in first gear, in second gear and in reverse, and is opened in third gear, fourth gear, etc.

Any suitable construction may be adopted for the control arrangements described above for the switches 31 or 31' and 36 respectively as a function of the gear combination and of the speed of the vehicle. For example, the switch 31 or 31' may be associated with the gear grid. In certain cases, a switch may be employed which is already coupled to the gear-box and provided for another purpose, for example a switch such as that provided in the circuit of the "Ferlec" clutch in order to modify the steps of the resistances in this circuit as a function of the gear combination. The switch 36 may co-operate with a centrifugal governor 38 mounted at 39 on the outgoing shaft 12b of the gear-box 12 or the input shaft of the differential, or again the speed indicator. This switch 36 may sometimes be provided as an original fitting on certain transmissions, for example with an overdrive.

In operation, as long as the vehicle speed does not fall below 15 km. per hour in third gear or any higher gear, the clutch 10 behaves as if the switches 31, 31' and 36 did not exist, and the lamp indicator 37 remains dark. When, due to negligence or for any other reason, the user makes the error of running in third gear or a higher gear at a speed of less than the predetermined speed e.g. 15 km. per hour, the two switches 31 and 36 are both closed at the same time, which excites the coil 18 and opens the relay 17, and the indicator 37 lights-up so as to warn the user. The clutch 10 becomes completely disengaged and will so remain until the user changes down to second gear and thus restores the normal running conditions from which he should not have departed. It will be seen that as in the aforesaid constructions of Figs. 1–4 the switch 31 or the switches 31 and 31' form the second switch of the control device while the switch 36 forms the third switch which when the output shaft of the gear-box is within predetermined unsafe limits overrides the switch 31 or switches 31 and 31'.

In addition, and as will be understood, the arrangement in accordance with the invention only makes it possible to start away from a stationary position at low combinations: first gear, second gear or reverse. In this case, the switch 31' is closed. If the hood 27 is normally closed, everything goes on in the ordinary way. On the other hand, if the hood 27 has remained open, the relay 18 is excited and this disengages the clutch.

Figure 6:
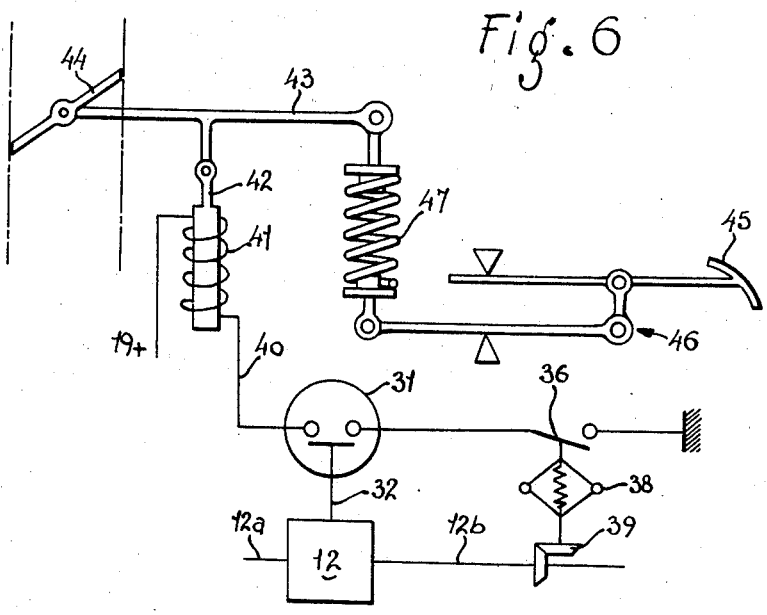

Reference will now be made to Fig. 6 in which there has been shown diagrammatically a further alternative form of security device in accordance with the invention. In Fig. 6, there will again be seen at 31 the second switch i.e. of the further control which is controlled by the gear combination, open in first gear, second gear and reverse, closed in third gear and higher combinations, and at 36 the switch actuated by the speed of the vehicle, open above the predetermined speed e.g. 15 km. per hour and closed below that speed.

The switches 31 and 36 are mounted on a conductor 40 which terminates at ground and which is connected to the battery 19 of the vehicle, with the interposition of the coil 41 of an electro-magnet, the plunger of which is seen at 42. The plunger 42 is pivoted on a lever 43 which controls the butterfly valve 44 of the carburetor. The lever 43 and the butterfly valve 44 are shown in the closed position of the latter. The lever 43 is coupled to the accelerator pedal 45 by means of a rod system or other appropriate coupling 46, comprising an elastic device 47. The stiffness of this device 47 is so chosen that it remains rigid under the action of the normal stresses of transmission or of return between the pedal 45 and the butterfly valve 44, but it becomes compressed when such stresses become increased by locking of the plunger 42.

As long as the vehicle speed does not fall below 15 km. per hour in third gear or a higher combination, at least one of the switches 31 and 36 or both are open. The coil 41 is de-energised. The plunger 42 is made completely free. The user operates the pedal 45 as he wishes, the movements of this pedal being faithfully transmitted to the butterfly valve 44, without the device 47 being compressed, and everything takes place normally.

When the user commits the error of running in third gear or a higher combination at less than 15 km. per hour, the two switches 31 and 36 close at the same time, and this excites the coil 41 and locks the plunger 42 in its extreme position in which it holds the valve 44 either wholly or partly closed. Any attempt to depress the pedal 45 will only result in compressing the device 47 and will have no effect on the butterfly valve 44. The user can then only again cause the driving torque to be applied by changing into second gear. As in the previous case, starting away with the engine will only again become possible in first gear, second gear, and reverse.

What we claim is:

1. In an automotive vehicle comprising an engine having a driver-actuated throttle, an automatic clutch, a gear-box having a low gear position range and a high gear position range, a control for said gear-box having a driver-actuated lever, a first declutching means for said clutch sensitive to the engine speed and declutching the clutch when said engine is idling, and a second declutching means for said clutch having an electric circuit and a switch in said circuit responsive to pressure exerted on said lever by the driver for changing gears and declutching the clutch while changing gears, said vehicle having a low speed range and a high speed range, the combination with said means of a further control of one of said declutching means, said further control comprising a second electric circuit, a second switch responsive to the output of the gear-box and constructed to assume one condition when the output is in high gear and another condition when the output is in low gear, a third switch in said second circuit, and a member movable between two positions according to the speed range of the vehicle for actuating said third switch to prevent engagement of the clutch when the gear-box is in a high gear position range and the vehicle runs in a low speed range.

2. A control device as claimed in claim 1, in which said further control controls said second declutching means.

3. In an automotive vehicle comprising an engine having a driver-actuated throttle, an automatic clutch, a gear-box having a neutral position and a low engaged gear position range, and a high engaged gear position range, a control for said gear-box having a driver-actuated lever, a first declutching means for said clutch sensitive to the engine speed, and declutching means for said clutch having an electric circuit and a switch in said circuit responsive to pressure exerted on said lever by the driver for changing gears and declutching the clutch while changing gears, said vehicle having a low speed range and a high speed range, the combination with said means of a further control of the second declutching means, said further control comprising a second electric circuit, a second switch in said second circuit responsive to said gear-box positions and constructed to assume one condition when the gear-box is in neutral and another condition when the gear-box is in gear, a third switch in said second circuit, a first movable member for actuating said third switch to prevent engagement of the clutch when the gear-box is in gear, a third electric circuit, a fourth switch in said third circuit responsive to the output of the gear-box and constructed to assume one condition when the output is in high gear and another condition when the output is in low gear, a fifth switch in said third electric circuit, and a second member movable between the two positions according to the vehicle speed ranges, for actuating said fifth switch to prevent engagement of the clutch when the gear-box is in high gear range and the vehicle runs in a low speed range.

4. In an automotive vehicle comprising an engine having a driver-actuated throttle, an automatic clutch, a gear box having a low gear position range and a high gear position range, a control for said gear-box having a driver-actuated lever, a first declutching means for said clutch sensitive to the engine speed and declutching the clutch when said engine is idling, and a second declutching means for said clutch having an electric circuit and a switch in said circuit responsive to pressure on said lever by the driver for changing gears and declutching the clutch while changing gears, said vehicle having a low speed range and a high speed range, the combination with said means of a further control of the first declutching means, said further control comprising a second electric circuit, a second switch in said second circuit responsive to the output of the gear-box and constructed to assume one condition when the output is in high gear and another condition when the output is in low gear, a third switch in said second circuit, and a member movable between two positions according to the vehicle speed ranges for actuating said third switch to prevent engagement of the clutch when the gear-box is in high gear range and the vehicle runs in a low speed range.

5. A control device as claimed in claim 4, in which said second electric circuit comprises an electro-magnet controlling the engine throttle opening to lower the engine speed to idling and declutching the clutch through the first declutching means when both vehicle speeds are in the low speed range and said gear-box is in said high gear position range.

References Cited in the file of this patent
UNITED STATES PATENTS

| | | |
|---|---|---|
| 2,248,747 | Dick | July 8, 1941 |
| 2,250,754 | Dooley | July 29, 1941 |
| 2,576,017 | Jeffrey et al. | Nov. 20, 1951 |
| 2,626,003 | Kutzer | Jan. 20, 1953 |
| 2,657,757 | Haynie | Nov. 3, 1953 |
| 2,708,005 | Gazzo | May 10, 1955 |